(12) United States Patent
Tonnelier

(10) Patent No.: US 7,823,631 B2
(45) Date of Patent: Nov. 2, 2010

(54) CONSTRUCTIONAL UNIT FOR A HEAT EXCHANGING DEVICE

(75) Inventor: Pierre Tonnelier, Kaysersberg (FR)

(73) Assignee: Behr France Rouffach SAS, Rouffach (FR)

( * ) Notice: Subject to any disclaimer, the term of this patent is extended or adjusted under 35 U.S.C. 154(b) by 1022 days.

(21) Appl. No.: 10/590,913

(22) PCT Filed: Feb. 11, 2005

(86) PCT No.: PCT/EP2005/001365

§ 371 (c)(1),
(2), (4) Date: Nov. 15, 2006

(87) PCT Pub. No.: WO2005/084972

PCT Pub. Date: Sep. 15, 2005

(65) Prior Publication Data

US 2008/0035308 A1    Feb. 14, 2008

(30) Foreign Application Priority Data

Feb. 26, 2004    (EP) .................................. 04290535

(51) Int. Cl.
*B60H 1/00* (2006.01)
*B60H 3/00* (2006.01)
*B60H 1/02* (2006.01)
*F28F 27/00* (2006.01)
*F28F 27/02* (2006.01)

(52) U.S. Cl. .................... 165/202; 165/42; 165/43; 165/203; 165/204; 165/96; 165/100; 165/103; 454/160; 454/161

(58) Field of Classification Search ............ 165/42, 165/43, 202, 203, 204, 96, 100, 103; 454/160, 454/161
See application file for complete search history.

(56) References Cited

U.S. PATENT DOCUMENTS

| 2,096,967 | A | * | 10/1937 | Johnson | ............... 165/229 |
| 3,807,490 | A | * | 4/1974 | Engel | ............... 165/202 |
| 3,841,395 | A | | 10/1974 | Steinmann | |
| 4,546,617 | A | * | 10/1985 | Suzuki et al. | ............... 62/180 |
| 4,913,034 | A | * | 4/1990 | Ripple et al. | ............... 454/157 |
| 5,299,431 | A | * | 4/1994 | Iritani et al. | ............... 62/243 |
| 6,311,763 | B1 | * | 11/2001 | Uemura et al. | ............... 165/43 |
| 6,544,115 | B1 | | 4/2003 | Graf | |
| 2003/0217833 | A1 | * | 11/2003 | Alber et al. | ............... 165/42 |

FOREIGN PATENT DOCUMENTS

FR    2 531 666 A1    2/1984
FR    2 769 262 A1    4/1999

* cited by examiner

*Primary Examiner*—Frantz F Jules
*Assistant Examiner*—Travis Ruby
(74) *Attorney, Agent, or Firm*—Muncy, Geissler, Olds & Lowe, PLLC

(57) ABSTRACT

A constructional unit for a heat exchanging device that includes at least one housing in which a gaseous medium is at least partially guided on a predetermined path, an inlet device for the gaseous medium, at least one first heat exchanging device, at least one second heat exchanging device, at least one controller that influences the direction of flow of the gaseous medium in at least some sections and that can be adjusted to at least two different positions, and an outlet device for the gaseous medium. In at least one first position of the first controller, substantially no portions of the gaseous medium are guided through the first heat exchanging device.

21 Claims, 7 Drawing Sheets

CONSTRUCTIONAL UNIT FOR A HEAT EXCHANGING DEVICE

BACKGROUND OF THE INVENTION

The present invention relates to a constructional unit for a heat exchanging device, in particular for motor vehicles. Constructional units of this type are known from the prior art. The constructional units typically have a heating device for air and an evaporator in order thereby to ensure an air conditioning of a vehicle interior. The prior art discloses solutions in which the air passing through the individual constructional units is subsequently conducted through all the individual devices, that is to say, in particular, the heating device and the evaporator. Although these constructional units operate satisfactorily, the routing of the air through all the devices may lead to power losses.

Furthermore, the heating or air conditioning systems are becoming increasingly more compact, as a result of which, in the units according to the prior art, the mixing zones are influenced to an ever greater extent, since the individual heat exchanger devices are arranged one behind the other with respect to the direction of flow of the air.

SUMMARY OF THE INVENTION

The object on which the present invention is based is, therefore, to provide a constructional unit for a heat exchanging device, said constructional unit having, for a gaseous medium passing through it, a routing which is improved in comparison with the prior art. The constructional unit according to the invention for a heat exchanging device has at least one housing, in which a gaseous medium is routed at least partially along a predetermined path, an inlet device for the gaseous medium, at least one first heat exchanging device, at least one second heat exchanging device and at least one first regulating device which at least partially influences the direction of flow of the gaseous medium. The first regulating device can be set in at least two different positions. In addition, an outlet device is provided for the gaseous medium. According to the invention, in at least one first position of the first regulating device, essentially no fractions of the gaseous medium are routed through the first heat exchanging device.

The advantage of the device according to the invention is that specific fractions of the air pass either through the first heat exchanging device or through the second heat exchanging device, not successively through both heat exchanging devices. Thus, in comparison with the prior art, power losses can be avoided, as stated above. Furthermore, by a suitable arrangement of the respective outlets for defrosting and for the foot space, in conjunction with the orientation of the heat exchanging devices, losses can be minimized, particularly when a high heating power for the feet is desired.

The gaseous medium is preferably the air which flows through the constructional unit and which is ultimately conducted into the vehicle interior for the air conditioning of the latter. Air is therefore also referred to below instead of the gaseous medium.

Influencing the direction of flow of the air is understood to mean that the direction of flow is at least partially changed, that is to say, in particular, the air is deflected.

In a further preferred embodiment of the constructional unit according to the invention, in a second position of the first regulating device, essentially no fractions of the air are routed through the second heat exchanging device. This means that the first regulating device can be brought into at least two positions, in one position the air passing essentially only through one of the heat exchanging devices and in a second position the air passing essentially only in each case through the other of the two heat exchanging devices.

Preferably, the first regulating device can be set variably, preferably continuously, between the first position and the second position which are preferably extreme positions. In this case, in the individual intermediate positions, specific fractions of the air pass through the first heat exchanging device, whereas other fractions of the air pass through the second heat exchanging device. In this way and due to the setting of the first regulating device, the fraction through the two heat exchanging devices is set in such a way that, in a first position, the entire air is routed through the first heat exchanging device, in the second position essentially the air is conducted completely through the second heat exchanging device, and in the intermediate positions the fractions are apportioned to the respective heat exchanging devices, such as, for example, 20% to the first heat exchanging device and 80% to the second heat exchanging device.

In a further preferred embodiment, at least one portion of the first regulating device, in at least one position, bears against at least one portion of the first heat exchanging device. The first regulating device is in this case preferably an air-impermeable flap. Particularly preferably, in the first position, the first regulating device covers the first heat exchanging device essentially completely. This prevents air from passing through the first heat exchanging device, and what is therefore achieved is that the air flows essentially completely through the second heat exchanging device.

In a further preferred embodiment, at least one portion of the regulating device bears, in at least one position, against at least one portion of the housing. In this case, the portion of the regulating device bears against the housing in such a way that the air cannot pass through the second heat exchanging device, and therefore essentially the entire fraction of the air passes completely through the first heat exchanging device. Preferably, essentially, a longitudinal edge of the first regulating device bears completely against the housing. Conversely, however, it is also possible that the first regulating device bears, in at least one position, against at least one portion of the second heat exchanging device, and, in this position, a passage of the air through the second heat exchanging device is thereby prevented.

In addition, it is also possible that the regulating device, in the first position, bears in at least one portion against the first heat exchanging device and, in the second position, bears against at least one portion of the second heat exchanging device and, preferably in the first position, covers the first heat exchanging device essentially completely, while, in the second position, it covers the second heat exchanging device essentially completely.

In addition, the regulating device may also be designed in the form of a slide regulator which in each case controls and/or regulates the quantity of air which arrives at the first or the second heat exchanging device.

Instead of an individual regulating device, in a further preferred embodiment, two separate or a plurality of regulating devices may also be provided, which in each case control and/or regulate the airstream through the first and/or the second heat exchanging device. Thus, one regulating device can regulate only the airstream through the first heat exchanging device, whereas a further regulating device regulates essentially only the airstream through the second heat exchanging device.

In addition, the noise levels can be reduced, this likewise being related to the decrease in power losses. Furthermore, owing to the constructional unit according to the invention, the efficiency in the de-icing, but, in particular, not solely of the front windshield, can be increased. It is pointed out, however, that not all the advantages mentioned are necessarily achieved by means of the same embodiment.

In a further preferred embodiment, the first heat exchanging device is arranged above the second heat exchanging device. This affords the advantage that the mixing zones lying downstream of the heat exchanging devices in the direction of flow of the air and the efficiency of the air mix occurring in these zones are improved.

In a further preferred embodiment, the first regulating device is accommodated in a first subspace of the housing, the first subspace of the housing, being arranged upstream of the first and the second heat exchanging device in the direction of flow of the air. This arrangement of the first regulating device within the housing ensures that the fractions of the air which pass through the first and the second heat exchanging device in each case can be controlled and/or regulated even upstream of the respective heat exchanging devices in the direction of flow.

Preferably, a second subspace of the housing is provided, which is arranged downstream of the first and the second heat exchanging device in the direction of flow of the air. This is preferably a mixing space, in which the respective fractions of the air which have passed through the first or the second heat exchanging device are intermixed with one another, in order thereby to set the mixing or desired temperature required by the user.

For this purpose, at least a partial intermixing of the gaseous medium passing through the first and the second heat exchanging device takes place in the second subspace. Preferably, the air passing through the two heat exchanging devices, that is to say the fractions of the air passing through, are intermixed essentially completely, so that the desired temperature of the air ultimately conducted into the vehicle interior can thereby be set as efficiently as possible.

In a further preferred embodiment, at least one deflection device for the gaseous medium is provided in the second subspace. This deflection device is, with respect to the first regulating device, a fixed device which at least partially changes the direction of flow of the air.

In a further preferred embodiment, the first heat exchanging device and the second heat exchanging device are arranged essentially parallel to one another. This means that a main direction of extent of the first heat exchanging device runs essentially parallel to a main direction of extent of the second heat exchanging device.

In a further preferred embodiment, at least one heat exchanging device has a predetermined length and a width and depth which are reduced considerably with respect to this length. What is achieved by this design is that the two heat exchanging devices may be arranged one above the other within the housing, without the construction space having to be enlarged considerably for this purpose.

Preferably, at least one heat exchanging device has a multiplicity of throughflow devices for a refrigerant. The refrigerant may in this case be, for example, water from the cooling circuit of the vehicle or the refrigerant used in an evaporator for cooling the air. Preferably, the individual throughflow devices have a length which is between 200 mm and 900 mm, preferably between 300 mm and 800 mm, and, particularly preferably, between 400 mm and 600 mm. As compared with the depth and width of the heat exchanging device, these lengths are markedly larger than the throughflow tube lengths used in the prior art. As illustrated above, what may be achieved by means of this increased length is that the individual heat exchanging devices may be arranged one above the other.

In a further preferred embodiment, a third heat exchanging device is provided. This third heat exchanging device is preferably a heating device selected from a group of heating devices which contains $CO_2$ heat pumps, heatings utilizing exhaust gas heat, fuel heatings, auxiliary heatings, electrical heatings and the like. This third heat exchanging device serves, in particular, for making it possible to heat a vehicle or at least de-ice the front windshield of the vehicle directly after the start when there is still no cooling water heat available.

In a preferred embodiment, the third heat exchanging device has a cross-sectional area which is reduced with respect to that of the first heat exchanging device. The first heat exchanging device is preferably likewise a heating device, particularly preferably such a heating device which utilizes the heat of the water from the cooling circuit of the motor vehicle in order to heat the air.

In a preferred embodiment, the third heat exchanging device is arranged downstream of the first heat exchanging device in the direction of flow of the air. In these exemplary embodiments, both the first and the third heat exchanging device are heating devices, so that this successive arrangement ensures in a particularly efficient way a heating of the air, particularly in the periods of time in which the first heating device can already achieve some, but not yet the full heating of the air.

In a further preferred embodiment, a multiplicity of outlet devices for the gaseous medium are provided. This multiplicity of outlet devices serves for controlling the temperature of various regions in the motor vehicle interior, such as, for example, the front and the rear foot space, the back region, the front region, the de-icing of the windshield and the like. The outlet devices have geometric cross sections which are selected from the groups of cross sections which have circular, polygon-like, in particular rectangular, and elliptic forms and mixed forms of these. In a particularly preferred embodiment, the outlets have an essentially rectangular configuration, with the result that a further reduction in the noise level is achieved. In addition, in the case of rectangular cross sections, production is cost-effective.

In a further preferred embodiment, at least one outlet device has a second regulating device for the emerging air. The quantity of air passing through the corresponding outlet device can thereby be regulated, and therefore a separate control and/or regulation of the air or its quantity entering the individual regions of the motor vehicle interior are/is possible.

In a further preferred embodiment, the constructional unit has a blower device. This blower device serves to convey the air through the constructional unit at a predetermined velocity, for example, when the vehicle is at a standstill or at low speeds.

BRIEF DESCRIPTION OF THE DRAWINGS

Further advantages of the unit according to the invention may be gathered from the accompanying drawings in which.

DETAILED DESCRIPTION

Figure 1:
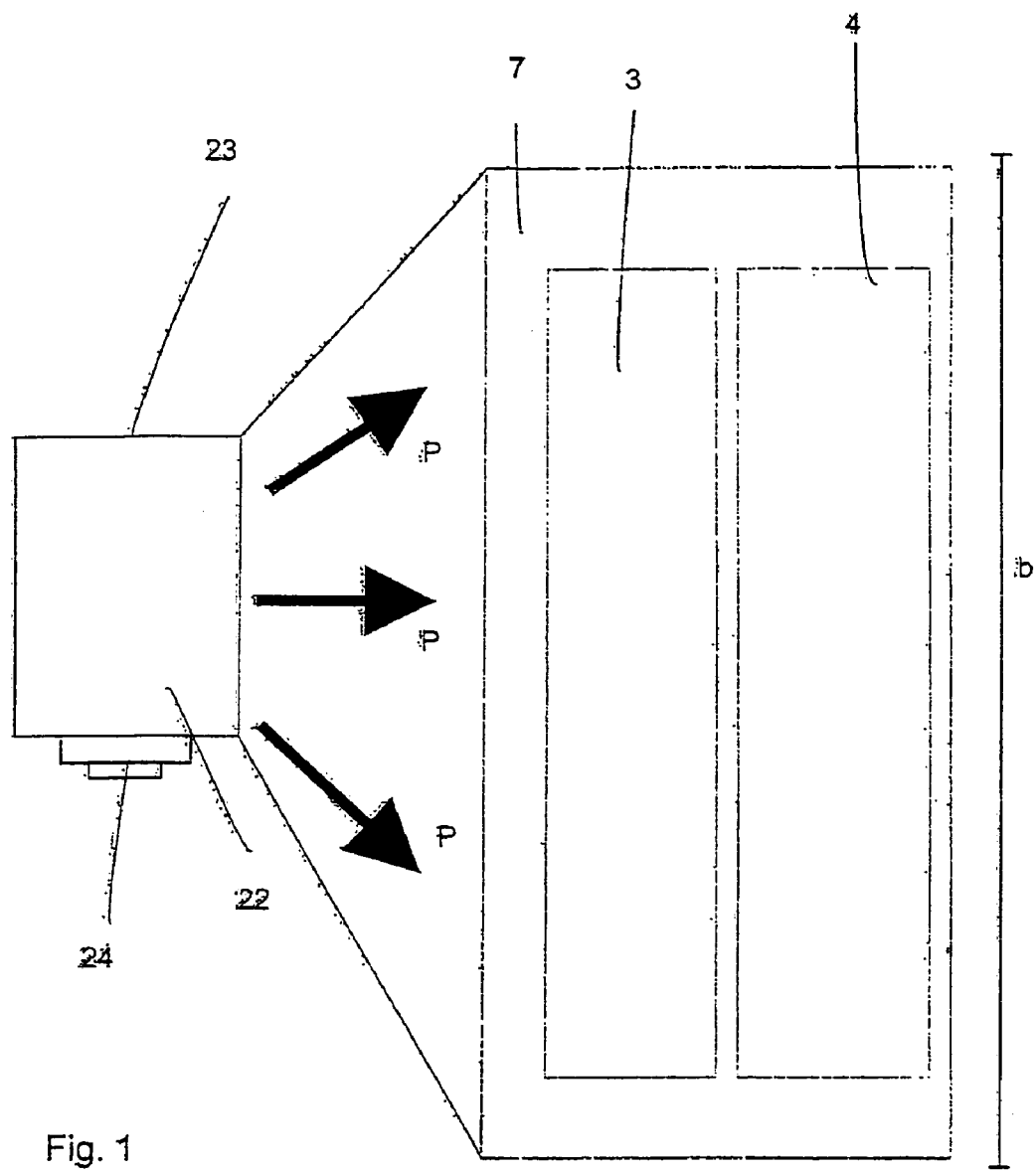
FIG. 1 shows a diagrammatic illustration of the constructional unit according to the invention for a heat exchanging device.

FIG. 1 shows diagrammatically the constructional unit according to the invention for a heat exchanging device. In this case, reference symbol 7 refers to a housing in which a first heat exchanging device 3 and a second heat exchanging device 4 are arranged. In this embodiment, the heat exchanging device 3 is a heating device and the heat exchanging device 4 is an evaporator. Air is supplied to the constructional unit via an inlet 23 and is accelerated in the direction of the arrows P, which indicate the airstream, by means of a fan 22 having a motor 24. Regulating devices (not shown) are arranged within the housing 7 in such a way that the airstream is routed either through the heat exchanging device 3 or the heat exchanging device 4 and finally passes through outlets (not shown) into the vehicle interior. In this case, the air does not flow through the two heat exchanging devices in succession, but, instead, specific fractions of the air pass either through the first heat exchanging device 3 or the second heat exchanging device 4.

In this case, the airstream enters the housing of the device along essentially the entire width b. It is also possible, however, to configure the entry of air into the housing such that the air enters the housing only along a portion of the width b.

Figure 2:
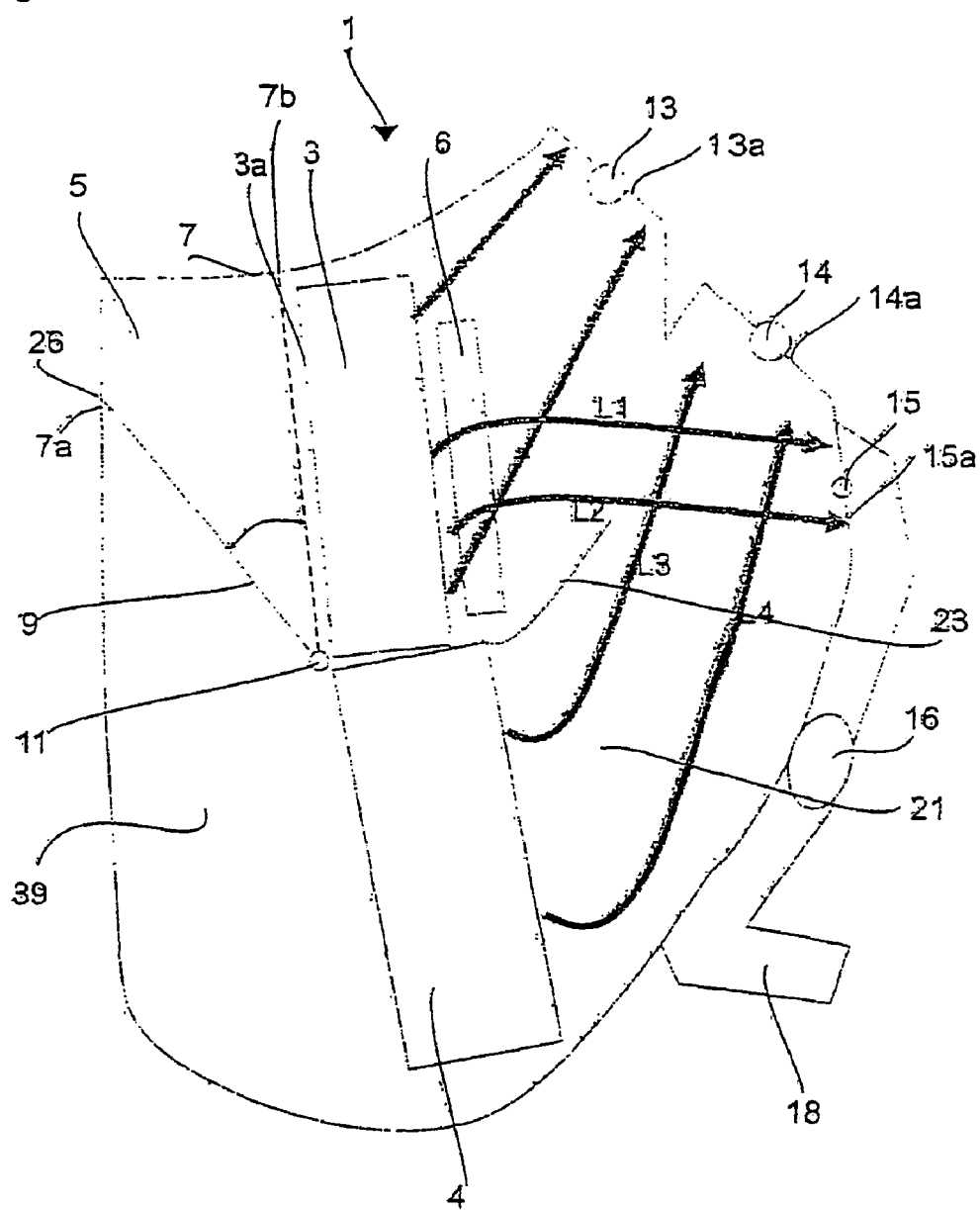
FIG. 2 shows a constructional unit according to the invention for a heat exchanging device in a first embodiment.

FIG. 2 shows a side view of a constructional unit according to the invention in a first embodiment. Here, the air enters the region 5 of the constructional unit through an inlet (not shown). In the illustration shown in FIG. 2, an end portion 26 of a first regulating device 9 comes to bear against a wall portion 7a of the housing 7. In this case, the first regulating device preferably extends in a direction perpendicular to the sheet plane in exactly the same way as the first heat exchanging device 3 and the second heat exchanging device 4. This prevents the situation where air may pass in the direction of the evaporator and, instead, the air is conducted solely in the direction of the heating device. In this way, the air is heated, subsequently passes through a PTC element 6 and is conducted out of the heating and/or air conditioning system through one of the outlets 13, 14, 16 or 18. Reference symbol 11 denotes a point or a joint at which the first regulating device, that is to say the air flap 9, is articulated and can thereby be rotated in the direction of the arrow P.

In a second position indicated by the dashed air flap, the first regulating device comes to bear against the heat exchanging device 3. In this case, preferably, the complete surface 3a of the heat exchanging device 3 is covered. Coming to bear is in this case understood to mean that the regulating device does not necessarily have to touch the heat outlet device, but, as shown in FIG. 2, also runs essentially parallel to this. In a special embodiment, the first regulating device may also actually touch the heat exchanging device 3. What must at least be achieved by the coming to bear is that the fractions of the air passing through the corresponding device are reduced.

In addition, in a further embodiment, the first regulating device may also bear against a portion 7b of the upper edge of the housing or against a wall (not shown) additionally directed inwards inside the housing.

Further possible arrangements of the first regulating device 9 would be clear to a person skilled in the art, what is critical being, as stated, that an airstream carrying heat through the heat exchanging device 3 is essentially prevented. In this case, the airflow is deflected in the direction of the second heat exchanging device 4 and flows through the latter. After the air has been cooled and preferably dried in the evaporator, it is conducted in the direction of the outlets.

In a position between the extreme positions of the first regulating device 9 which are shown in FIG. 2, filter fractions of the air are conducted through the heating device or the first heat exchanging device 3, and other fractions are conducted through the second heat exchanging device 4, that is to say, in this embodiment, the evaporator. After the flow through the two heat exchanging devices 3, 4, a mixing of the individual air fractions takes place in the space 21, which is arranged downstream of the heat exchanging devices in the direction of flow of the air, so that a mixed temperature of the emerging air is established as a result. Preferably, second regulating devices 13a, 14a and 16a are arranged in the outlets 13, 14, 16 and 18 and control or regulate the quantity of the air passing through these outlets.

The outlet 13 defines a defrosting or de-icing outlet for the defrosting of the windshield. Reference symbol 14 denotes an outlet through which the air is conducted into the front region of the motor vehicle interior. Reference symbol 16 denotes an outlet for the feet in the motor vehicle front region and reference symbol 18 an outlet for the rear foot region. This rear region is in this embodiment not provided with a first regulating device.

In this case, in this embodiment, regulating devices, preferably of the individual second regulating devices (13a, 14a, 16a), are placed relatively high up, in order to achieve as beneficial an intermixing of the individual air fractions as possible in the case of an intermediate position of the first regulating device 9. This is illustrated by the intersecting parts L1 and L2, on the one hand, and L3 and L4, on the other hand. A separating device or partition wall 23 within the second space 21 prevents the heated air from passing into the lower region of the space 21.

Figure 2A:
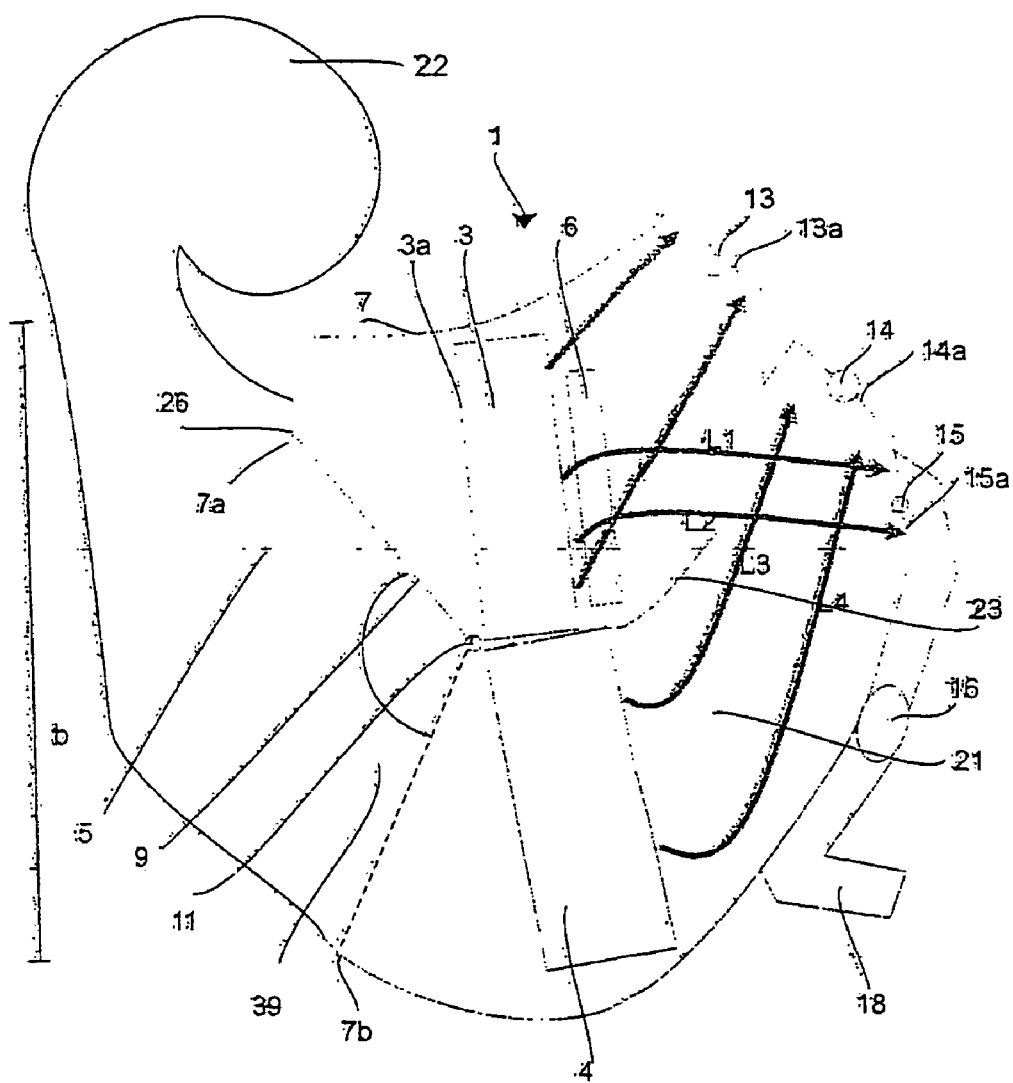
FIG. 2a shows a constructional unit according to the invention for a heat exchanging device in a further embodiment.

FIG. 2a illustrates a further embodiment of the heat exchanging device according to the invention. Accelerated by the fan 23, the air enters the housing 7 of the heat exchanging device via the inlet 5. In this case, the width of the inlet 5 may extend essentially over the entire width b of the rear wall 40 of the device or else only over a rear wall portion of any desired size.

In this embodiment, the regulating device 9 can be moved between a position in which it bears against the housing portion 7a and a position in which it bears against the housing portion 7b. Thus, in this embodiment, too, the fractions which arrive at the respective heat exchanging devices 3, 4 can be regulated.

Figure 3:
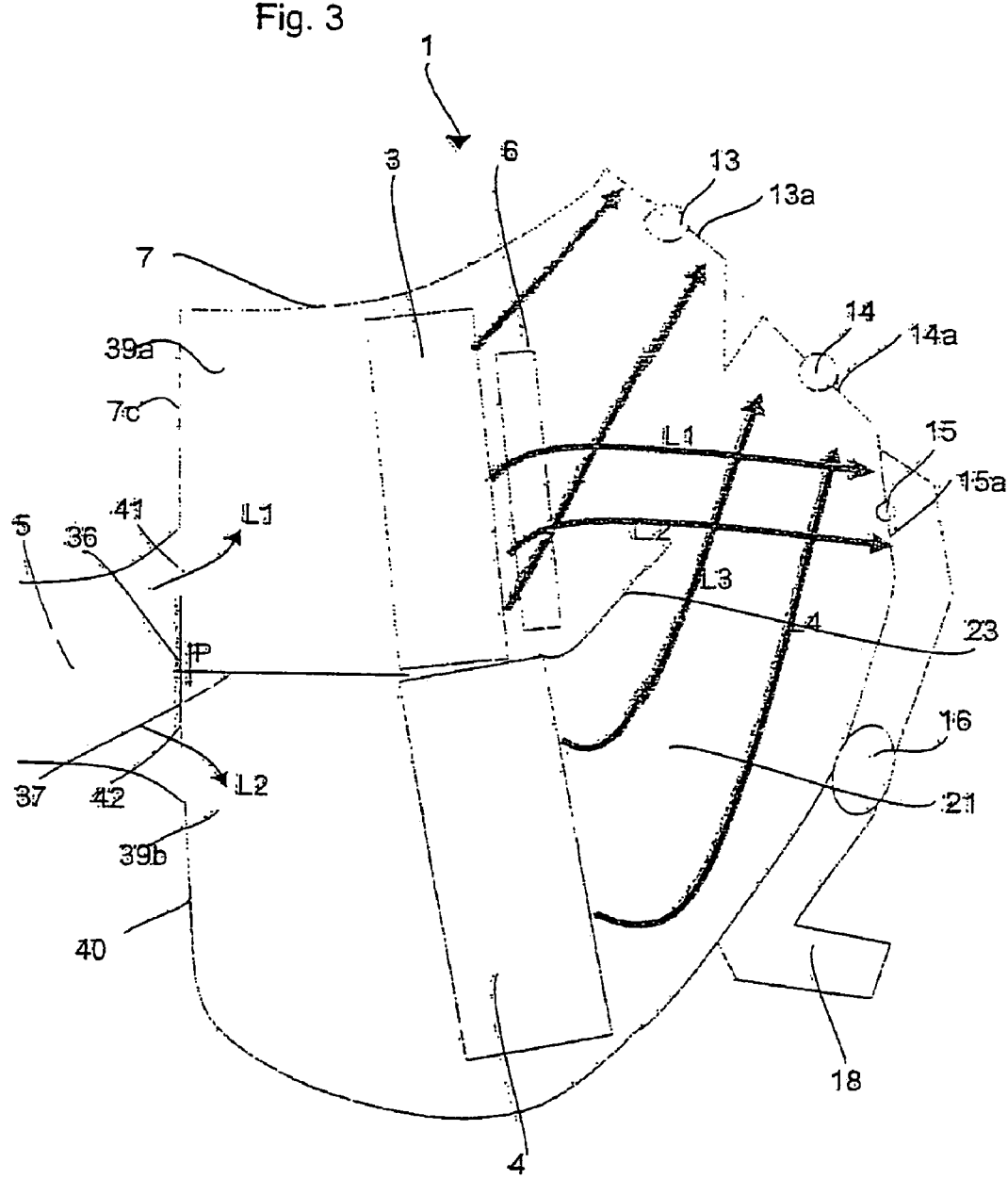
FIG. 3 shows a constructional unit according to the invention for a heat exchanging device in a further embodiment.

FIG. 3 shows a further embodiment of the constructional unit according to the invention for a heat exchanging device. In this case, the air passes into the housing 7 of the constructional unit via an inlet 5. In this embodiment, too, the width of this inlet 5 may be selected such that the inlet 5 extends essentially along the entire wall 40 of the housing or only along a predetermined portion, as shown in FIG. 3.

Reference symbol 6 denotes a slide regulator 36 which can be displaced in the direction of the arrow P along the portion 7b of the housing wall. Reference symbol 37 denotes a partition wall which is arranged inside the housing 7 and which subdivides the space lying upstream of the heat exchanging devices 3 and 4 in the direction of flow of the air into two subspaces 39a and 39b essentially sealingly or in an airtight manner. Reference symbols 41 and 42 denote two ports in the housing 7, the port 41 leading into the space 39a and the port 42 into the space 39b.

With the slide regulator 36 in FIG. 3 is in its uppermost position, essentially the port 41 is blocked completely and the entering air passes completely into the space 39b and therefore essentially completely through the heat exchanging device 4; when the regulator 36 in its lowermost position, conversely, the port 42 is blocked completely and the air passes solely into the space 39a and thus essentially completely through the heat exchanging device 3. In positions lying between these extremes, air passes both into the subspace 29a and into the subspace 39b, so that, in a similar way to what has already been described above, a resulting mixing temperature can be set.

Figure 4:
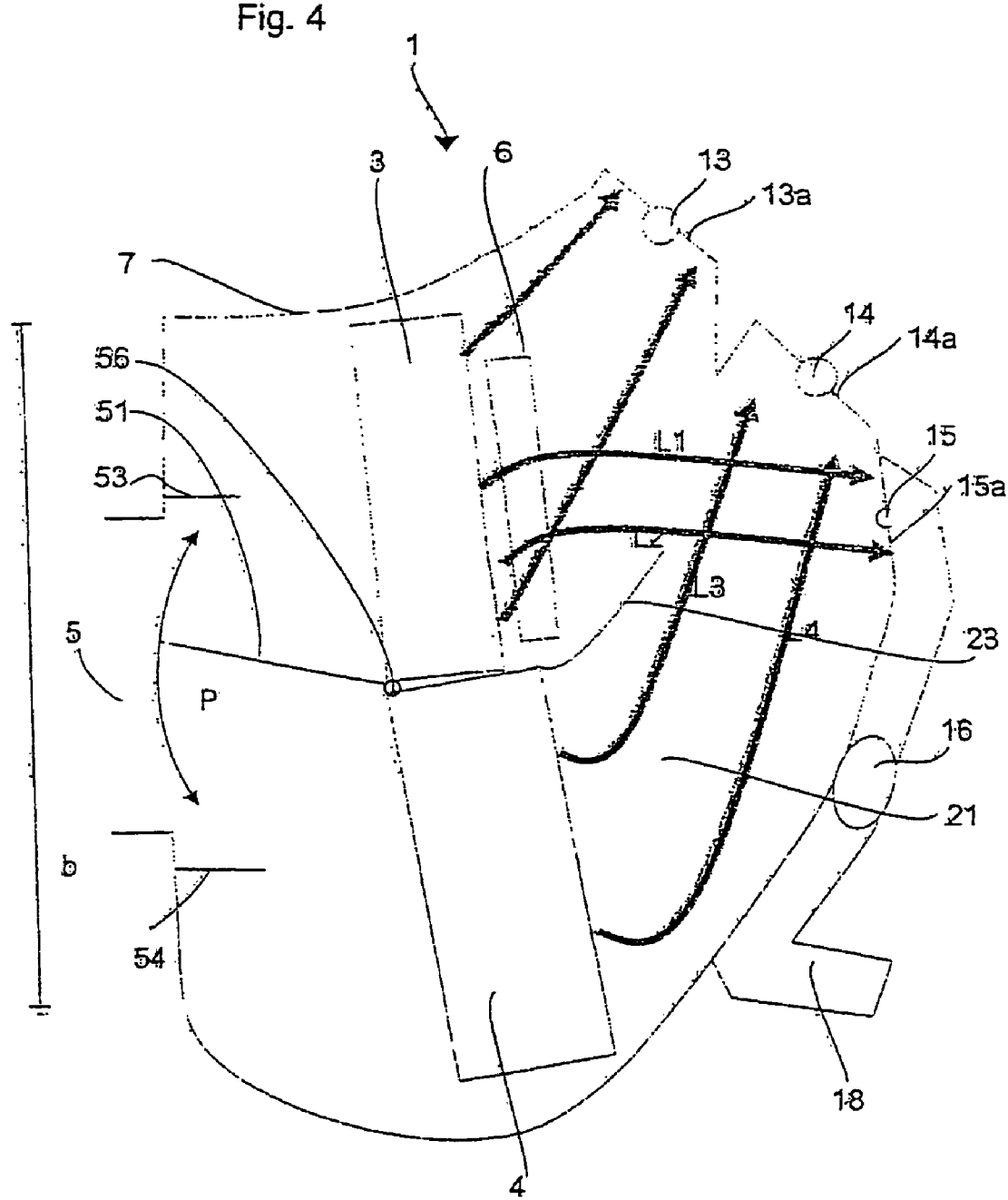
FIG. 4 shows a constructional unit according to the invention for a heat exchanging device in a further embodiment.

FIG. 4 illustrates a further embodiment of the constructional unit according to the invention. In this case, a first regulating device 51 is provided, which can be moved about an articulation point 56 in the direction of the arrow P. In this case, the first regulating device 51 bears against a wall 53 inside the housing in one extreme position and against a wall 54 in a further extreme position. If the first regulating device 51 bears against the wall 54, the air entering through the inlet 5 or 7 can follow only the flow path via the first heat exchanging device 3. If, conversely, the first regulating device 51 bears against the wall 53, the air flows completely through the second heat exchanging device 4. Between these two extreme positions of the first regulating device 51, the air is distributed to the subspaces 39a and 38b, the fractions depending on the respective position of the first regulating device 51. In this embodiment, too, the width of the inlet may be dimensioned differently.

Figure 5A:
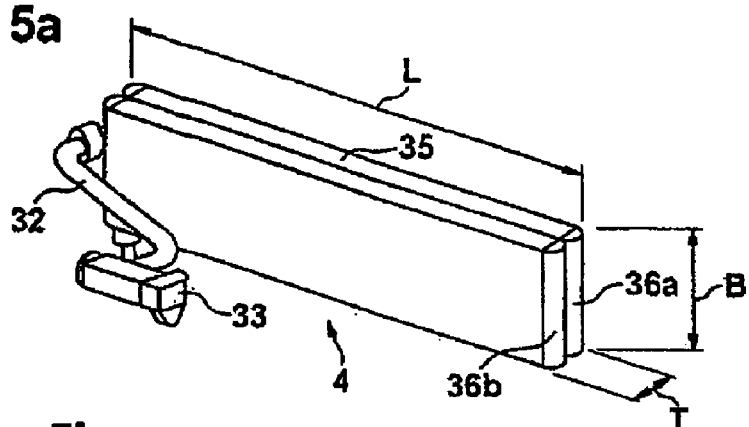
FIG. 5a shows a second heat exchanging device for the constructional unit according to the invention.

FIG. 5a illustrates a heat exchanging device 4 for a constructional unit according to the invention.

Figure 5B:
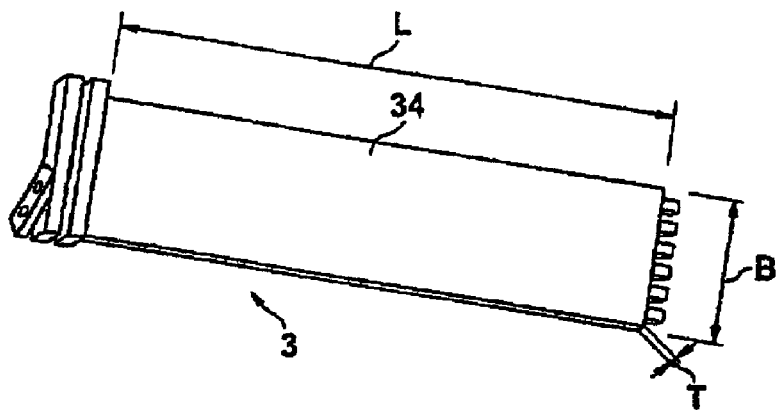
FIG. 5b shows a first heat exchanging device for the constructional unit according to the invention.
Figure 5C:
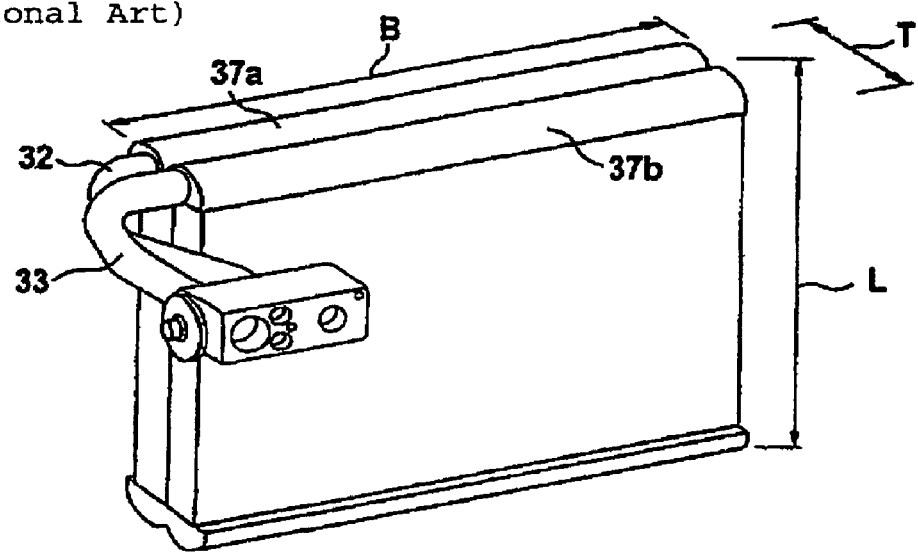
FIG. 5c shows a heat exchanging device according to the prior art.

FIG. 5c illustrates a heat exchanging device according to the prior art. It can be seen that, in the case of the heat exchanging device 4 for the constructional unit according to the invention, the width of the device is reduced considerably with respect to the length, as compared with the prior art. The second heat exchanging device 3, shown in FIG. 5b, also has a markedly reduced width with respect to the length L. This design makes it easier to arrange the two heat exchanging devices one above the other, as described.

Reference symbol 35 denotes a multiplicity of throughflow devices or throughflow tubes through which a refrigerant can flow. This refrigerant is supplied to the device and discharged from it respectively through inflows and outflows 32, 33. Reference symbols 36a and 36b refer to collecting and/or distributing tubes which are provided at the ends of the throughflow tubes 35.

The device 4 of the constructional unit according to the invention has a length of between 200 mm and 900 mm, preferably of between 300 mm and 800 mm and particularly preferably of between 400 mm and 600 mm. The width B of the device 3 is between 60 mm and 250 mm, preferably between 80 mm and 180 mm and particularly preferably between 100 mm and 140 mm. The operative cross section of the device is between 2 $dm^2$ and 9 $dm^2$, preferably between 3 $dm^2$ and $7^2$ and, particularly preferably, between 5 $dm^2$ and 6 $dm^2$.

The depth of the device 4 is between 20 mm and 120 mm, preferably between 40 mm and 90 mm and particularly preferably between 60 mm and 70 mm.

FIG. 5b illustrates a first heat exchanging device 3. The length L of this device is between 200 mm and 800 mm, preferably between 300 mm and 600 mm and particularly preferably between 350 mm and 450 mm.

The width B of this first device 3 is between 50 mm and 200 mm, preferably between 70 mm and 150 mm and particularly preferably between 100 mm and 130 mm.

The operative cross section of the first heat exchanging device 3 is between 2 $dm^2$ and 9 $dm^2$, preferably between 3 $dm^2$ and 8 $dm^2$ and particularly preferably between 4 $dm^2$ and 5 $dm^2$.

As stated above, FIG. 5c shows a heat exchanging device according to the prior art. In this case, in this device, the width B is greatly increased with respect to the length L, that is to say the cross section is closer to the geometric form of a square than in the case of the devices shown in FIGS. 5a and 5b.

Figure 6A:
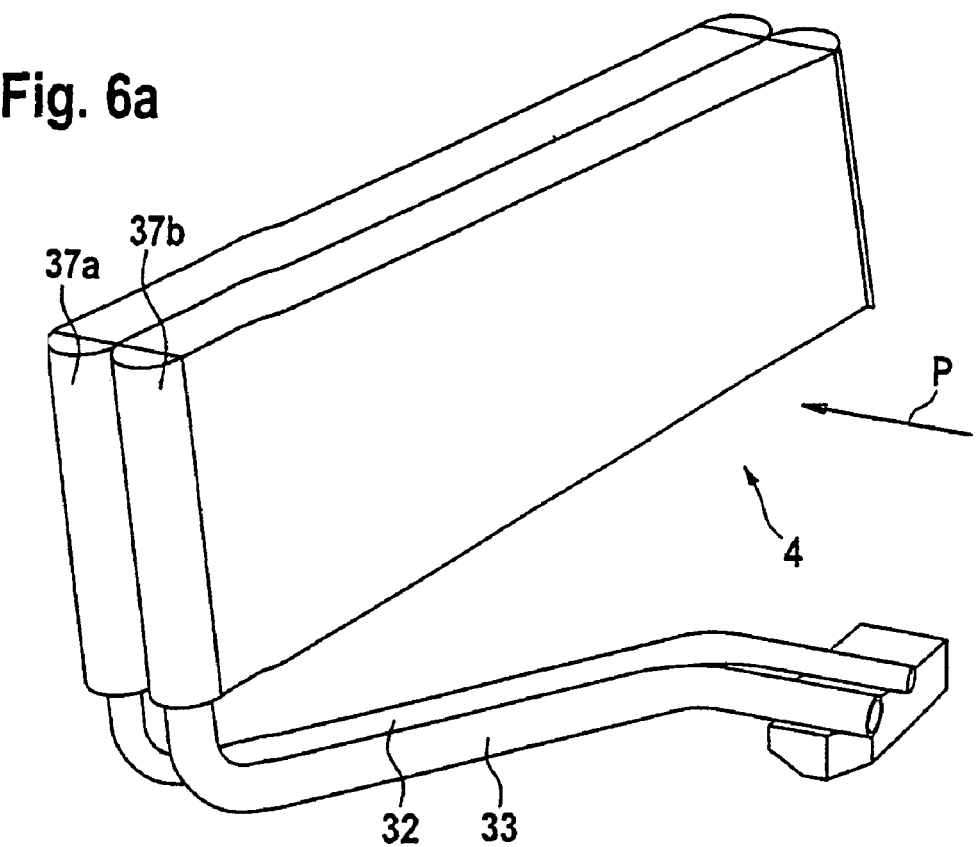
FIG. 6a shows a second heat exchanging device for the constructional unit according to the invention, in a further embodiment.

FIG. 6a illustrates a further embodiment of a heat exchanging device (4). In this case, the arrow P designates the direction of flow of the air impinging onto this device. In contrast to the device shown in FIG. 5a, here, the inflow and outflow tubes 32 and 33 are both arranged at the end of the collecting and/or distributing tubes 37a and 37b.

Figure 6B:
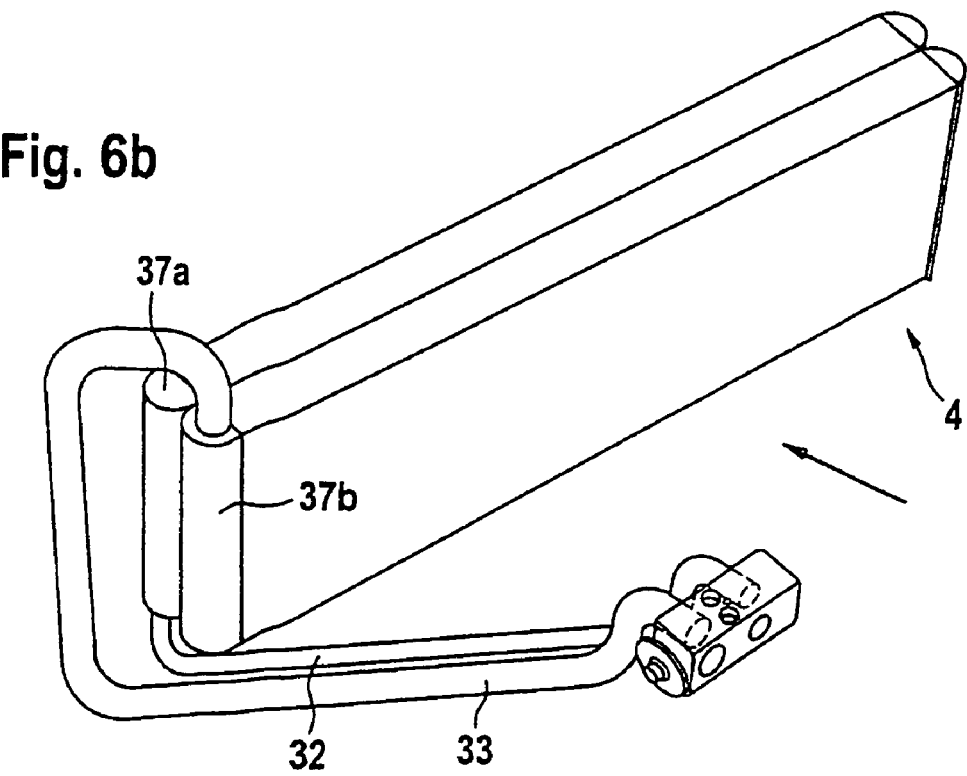
FIG. 6b shows a second heat exchanging device for the constructional unit according to the invention in a further embodiment.

FIG. 6b shows a further embodiment of a first heat exchanging device. In this case, the inflow and outflow tubes 32 and 33 are arranged at the respectively opposite ends with respect to the collecting and distributing tubes 37a and 37b.

The arrangement of the inflow and outflow tubes may in this case be adapted to the spatial conditions within the constructional unit.

The invention claimed is:

1. A constructional unit for a heat exchanging device, with at least one housing in which a gaseous medium is routed at least partially along a predetermined path, with an inlet device for the gaseous medium, with at least one first heat exchanging device, with at least one second heat exchanging device, with a first regulating device which influences the direction of flow of the gaseous medium and which can be set in at least two different positions, and with an outlet device for the gaseous medium, wherein, in at least one first position of the first regulating device, substantially no fractions of the gaseous medium are routed through the first heat exchanging device and in at least one second position of the first regulating device substantially no fractions of the gaseous medium are routed through the second heat exchanging device, wherein the first heat exchanging device and the second heat exchanging device are arranged at least partially one above the other and wherein at least one portion of the first regulating device, in at least one position, bears against at least one portion of the first heat exchanging device.

2. The constructional unit as claimed in claim 1, wherein the first heat exchanging device is arranged above the second heat exchanging device.

3. The constructional unit as claimed in claim 1, wherein the first regulating device can be set continuously between the first position and the second position.

4. The constructional unit as claimed in claim 1, wherein at least one portion of the first regulating device, in at least one position, bears against at least one portion of the housing.

5. The constructional unit as claimed in claim 1, wherein the first regulating device is accommodated in a first subspace of the housing, the first subspace of the housing being arranged upstream of the first and the second heat exchanging device in the direction of flow of the gaseous medium.

6. The constructional unit as claimed in claim 1, wherein a second subspace of the housing is provided, which is arranged downstream of the first and the second heat exchanging device in the direction of flow of the gaseous medium.

7. The constructional unit as claimed in claim 1, wherein at least a partial intermixing of the gaseous medium passing through the first and the second heat exchanging device takes place in the second subspace.

8. The constructional unit as claimed in claim 1, wherein at least one deflection device for the gaseous medium is provided in the second subspace.

9. The constructional unit as claimed in claim 1, wherein the first heat exchanging device and the second heat exchanging device are arranged substantially parallel to one another.

10. The constructional unit as claimed in claim 1, wherein at least one heat exchanging device has a predetermined length and a width and depth, said width and said depth being less than said length.

11. The constructional unit as claimed in claim 1, wherein a third heat exchanging device is provided.

12. The constructional unit as claimed in claim 1, wherein at least one heat exchanging device has a multiplicity of throughflow devices for a refrigerant.

13. The constructional unit as claimed in claim 1, wherein the throughflow devices have a length which is between 400 mm and 600 mm.

14. The constructional unit as claimed in claim 1, wherein the third heat exchanging device is a heating device selected from a group of heating devices which contains $CO_2$ heat pumps, heatings utilizing exhaust gas heat, fuel heatings, auxiliary heatings, and electrical heatings.

15. The constructional unit as claimed in claim 1, wherein the third heat exchanging device has a cross-sectional area which is reduced with respect to that of the first heat exchanging device.

16. The constructional unit as claimed in claim 1, wherein the first heat exchanging device is a heating device.

17. The constructional unit as claimed in claim 1, wherein the third heat exchanging device is arranged downstream of the first heat exchanging device in the direction of flow of the gaseous medium.

18. The constructional unit as claimed in claim 1, wherein a multiplicity of outlet devices for the gaseous medium are provided.

19. The constructional unit as claimed in claim 1, wherein at least one outlet device has a substantially rectangular cross section.

20. The constructional unit as claimed in claim 1, wherein at least one outlet device has a second regulating device for the emerging gaseous medium.

21. The constructional unit as claimed in claim 1, wherein the constructional unit has, furthermore, a blower device.

* * * * *